(12) United States Patent
Dhimitri et al.

(10) Patent No.: US 6,670,961 B2
(45) Date of Patent: Dec. 30, 2003

(54) METHOD AND APPARATUS FOR ENHANCED CONNECTORS AND CONNECTION MANAGER

(75) Inventors: William James Dhimitri, Ithaca, NY (US); Carsten Hess, Ithaca, NY (US); Walter Christian Welton-Lair, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 193 days.

(21) Appl. No.: 09/782,506

(22) Filed: Feb. 13, 2001

(65) Prior Publication Data

US 2001/0024207 A1 Sep. 27, 2001

Related U.S. Application Data

(63) Continuation-in-part of application No. 09/589,049, filed on Jun. 6, 2000, which is a continuation-in-part of application No. 09/088,116, filed on Jun. 1, 1998, now Pat. No. 6,232,983.

(51) Int. Cl.⁷ ................................................ G09G 5/00
(52) U.S. Cl. ...................................... 345/619; 345/964
(58) Field of Search ................................ 345/619, 649, 345/650, 964, 419, 420

(56) References Cited

U.S. PATENT DOCUMENTS

| 5,444,836 A | 8/1995 | Hollingsworth et al. |
| 5,490,241 A | 2/1996 | Mallgren et al. |
| 5,513,303 A | 4/1996 | Robertson et al. |
| 5,513,309 A | 4/1996 | Meier et al. |
| 5,564,004 A | 10/1996 | Grossman et al. |
| 5,572,639 A | 11/1996 | Gantt |
| 5,581,670 A | 12/1996 | Bier et al. |
| 5,627,949 A | 5/1997 | Letcher, Jr. |
| 5,633,955 A | 5/1997 | Bozinovic et al. |
| 5,704,028 A | 12/1997 | Schanel et al. |
| 5,760,774 A | 6/1998 | Grossman et al. |
| 5,818,457 A | 10/1998 | Murata et al. |
| 5,856,828 A | 1/1999 | Letcher, Jr. |
| 5,894,310 A | 4/1999 | Arsenault et al. |
| 5,900,874 A | 5/1999 | Schrader et al. |
| 5,990,900 A | 11/1999 | Seago |
| 6,016,147 A | 1/2000 | Gantt |
| 6,047,078 A | 4/2000 | Kang |
| 6,051,028 A | 4/2000 | McCartney et al. |
| 6,366,293 B1 * | 4/2002 | Hamilton et al. ........... 345/649 |
| 6,389,375 B1 * | 5/2002 | Thomsen et al. .............. 703/2 |
| 6,392,645 B1 * | 5/2002 | Han et al. ................... 345/619 |

OTHER PUBLICATIONS

"*What Is an Object*", The Java™ Turorial, http://java.sun.com/docs/books.tutorial/java/concepts/object.html, Sun Microsystems, Inc., Copyright 1995–2003, 2pp.

(List continued on next page.)

*Primary Examiner*—Matthew Luu
(74) *Attorney, Agent, or Firm*—Gates & Cooper LLP

(57) ABSTRACT

A connector object supports bi-directional connections such that an instance of the connector object may behave as both a socket connector and as a plug connector. A first shape object and a second shape object having a first connector object and second connector object respectively that are instances of the same connector object are displayed on a display device. The first connector object is coupled to the second connector object wherein the first connector object and the second connector object behave both as sockets and plugs. An external connection manager resolves connections. The manager determines: (1) if shape connections should be resolved; and (2) one or more socket connector objects and plug connector objects that need to be updated from one or more other shapes coupled to the determined socket connector objects. Thereafter, the manager recursively updates each determined plug connector object.

36 Claims, 5 Drawing Sheets

OTHER PUBLICATIONS

"*JavaScript Tutorial for Programmers—Objects*", Web Developer's™ <Virtual Library>, Aaron Weiss, http://www.wdvl.com/Authoring/JavaScript/Tutorial/objects.html Jul. 12, 1998, 6pp.

Townsend, et al., "Microsoft Office 6–in–1", 1994, Que Corporation, see p. 713.

Mark Edel, "The Tinkertoy Graphical Programming Environment", IEEE pp. 1110–1115.

Que, "Microsoft Office 6–in–1 New Edition", p. 713.

* cited by examiner

METHOD AND APPARATUS FOR ENHANCED CONNECTORS AND CONNECTION MANAGER

CROSS REFERENCE TO RELATED APPLICATIONS

This application is a continuation-in-part of the following co-pending and commonly assigned U.S. patent application Ser. No. 09/589,049, filed on Jun. 6, 2000, by William James Dhimitri et al., entitled "DYNAMIC POSITIONING AND ALIGNMENT AIDS FOR SHAPE OBJECTS," which application is a continuation-in-part of U.S. patent application Ser. No. 09/088,116, filed on Jun. 1, 1998, by Lawrence D. Felser et al, entitled "POSITIONING AND ALIGNMENT AIDS FOR SHAPE OBJECTS HAVING AUTHORABLE BEHAVIORS AND APPEARANCES", now U.S. Pat. No. 6,232,893, issued on May 15, 2001.

This application is related to the following applications:

U.S. patent application Ser. No. 09/488,308, filed on Jan. 20, 2000, by Lawrence D. Felser et al., entitled "SHAPE OBJECTS HAVING AUTHORABLE BEHAVIORS AND APPEARANCES," now U.S. Pat. No. 6,219,056, issued on Apr. 17, 2001, which is a continuation of U.S. patent application Ser. No. 09/092,383, filed on Jun. 5, 1998, by Lawrence D. Felser et al., entitled "SHAPE OBJECTS HAVING AUTHORABLE BEHAVIORS AND APPEARANCES," now U.S. Pat. No. 6,064,386, issued on May 16, 2000, which application is a continuation in part of U.S. patent application Ser. No. 09/088,116, filed on Jun. 1, 1998, by Lawrence D. Felser et al, entitled "POSITIONING AND ALIGNMENT AIDS FOR SHAPE OBJECTS HAVING AUTHORABLE BEHAVIORS AND APPEARANCES", now U.S. Pat. No. 6,232,893, issued on May 15, 2001, and U.S. patent application Ser. No. 09/450,207, filed on Nov. 29, 1999, by Lawrence D. Felser et al., entitled "FRAMEWORK FOR OBJECTS HAVING AUTHORABLE BEHAVIORS AND APPEARANCES," now U.S. Pat. No. 6,462,751, issued on Oct. 8, 2002, which application is a continuation of U.S. patent application Ser. No. 09/169,599, filed on Oct. 9, 1998, by Lawrence D. Felser et al., entitled "FRAMEWORK FOR OBJECTS HAVING AUTHORABLE BEHAVIORS AND APPEARANCES," now U.S. Pat. No. 6,025,849, issued on Feb. 15, 2000, which application is a continuation-in-part of U.S. patent application Ser. No. 09/092,383, filed on Jun. 5, 1998, by Lawrence D. Felser, et al., entitled "SHAPE OBJECTS WITH AUTHORABLE BEHAVIORS AND APPEARANCES," now U.S. Pat. No. 6,064,386, issued on May 16, 2000, which application is a continuation-in-part of U.S. patent application Ser. No. 09/088,116, filed on Jun. 1, 1998, by Lawrence D. Felser et al., entitled "POSITIONING AND ALIGNMENT AIDS FOR SHAPE OBJECTS WITH AUTHORABLE BEHAVIORS AND APPEARANCES", now U.S. Pat. No. 6,232,893, issued on May 16, 2001, and said U.S. Pat. No. 6,025,849, issued on Feb. 15, 2000, is also a continuation-in-part of U.S. patent application Ser. No. 09/088,116, filed on Jun. 1, 1998, by Lawrence D. Felser et al., entitled "POSITIONING AND ALIGNMENT AIDS FOR SHAPE OBJECTS WITH AUTHORABLE BEHAVIORS AND APPEARANCES", now U.S. Pat. No. 6,232,893, issued on May 15, 2001, all of which applications are incorporated by reference herein.

BACKGROUND OF THE INVENTION

1. Field of the Invention

The present invention relates generally to graphical user interfaces, and in particular, to a method, apparatus, and article of manufacture for connecting shapes using a bi-directional connector object and for resolving connections using an external connection manager.

2. Description of the Related Art

The use of Computer Assisted Drafting (CAD) application programs is well known in the art. Some CAD programs provide templates and palettes that help users create documents, graphical presentations, etc. These templates and palettes provide only limited assistance and do little to help the user connect standard CAD components, define new components, or define methods of manipulating the components within the CAD program.

Many standard components have one or more unidirectional plugs or one or more unidirectional sockets that can connect to another socket or plug respectively. Each plug or socket is an instance of an object that allows the socket or plug to connect in one direction with a plug or socket respectively. For example, an instance of a plug object on a shape may connect to an instance of a socket object on another shape. Such plugs and sockets are unidirectional. Thus, a plug may only connect into a socket and cannot receive another plug or a socket. Similarly, a socket may only receive a plug and cannot connect into another socket or a plug.

As a result of the unidirectional nature of the plugs and sockets, various circumstances may result. For instance, if a first shape with a plug connector is plugged into a socket of a second shape and the first shape is moved, the plug will most likely unplug and separate from the socket. However, if the second shape is moved, the plug may follow the socket. Such properties and circumstances ate undesirable and frustrating to users.

Consequently, there is a need in the art for improved techniques for connecting shapes in a CAD or drawing program.

SUMMARY OF THE INVENTION

To address the requirements described above, the present invention discloses a method, apparatus, and article of manufacture for connecting objects in a drawing application. One or more connector objects owned by a shape object provide connectivity to other connector objects of other shape objects. In a connector object, plug and socket behavior ate merged into a single connector object that no longer requires the use of separate plug and socket objects. Using flags, each connector object may be configured to behave as either a plug (referred to as a plug connector), socket (referred to as a socket connector), or both. Since connector objects can simultaneously act as plugs and sockets, connector objects support bi-directional connections.

The task of resolving/updating connections and connector objects may be delegated to an external connection manager. Given a list of changed connections, the connection manager uses a spanning-tree algorithm to efficiently update all connections, including circular references. Accordingly, the connection manager recursively processes connector objects in a drawing until all necessary connector objects and shape objects have been resolved/updated. Having an external connection manager allows complete control over when connections are resolved.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-aided design (CAD) program that provides connector objects that are bi-directional such that instances of a connector object support behavior as a socket connector or plug connector. Additionally, an external connection manager resolves connections by recursively updating connections in a drawing.

Hardware Environment

Figure 1:
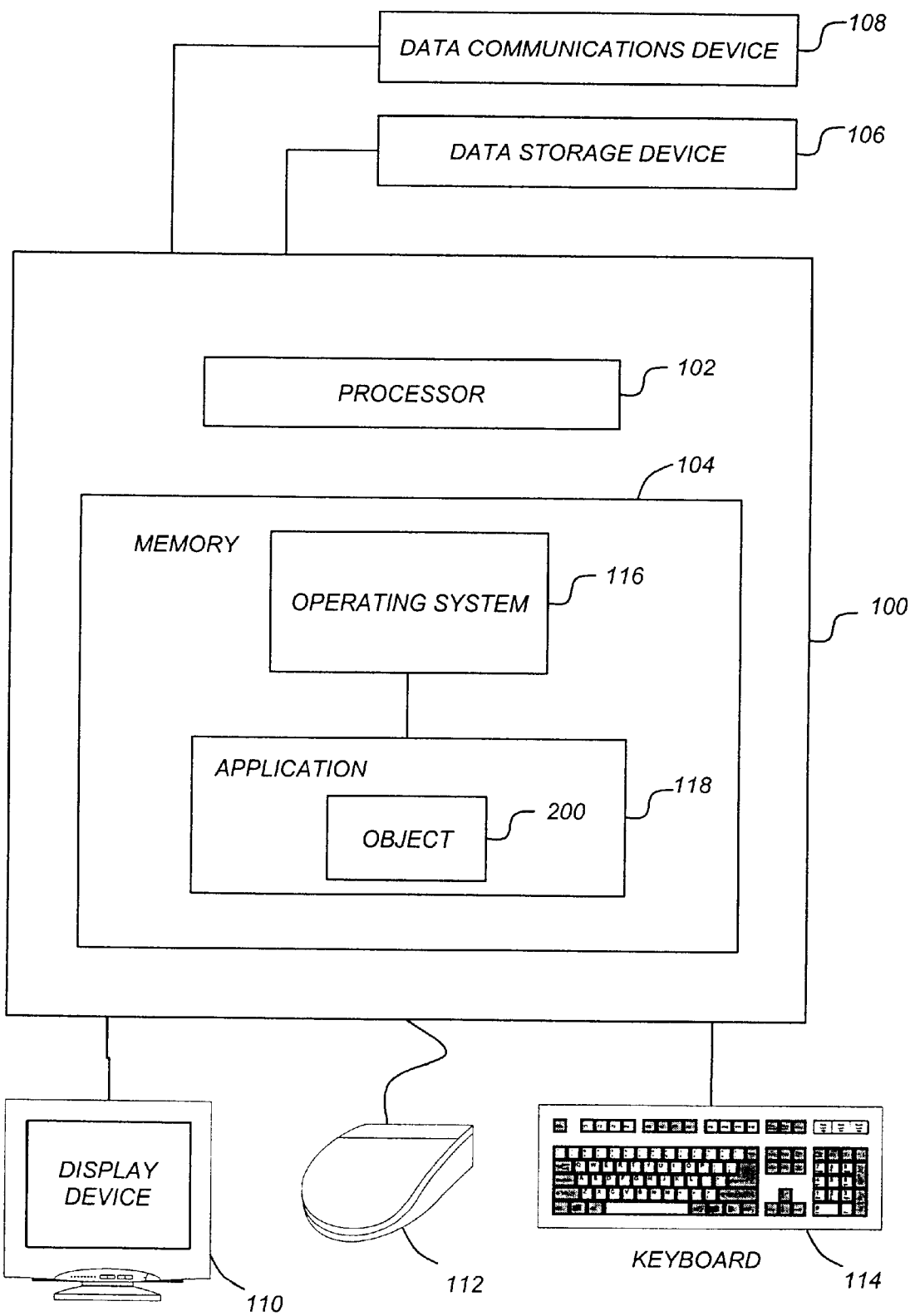
FIG. 1 is an exemplary hardware environment used to implement one or more embodiments of the invention.

FIG. 1 is an exemplary hardware environment used to implement one or more embodiments of the invention. The present invention is typically implemented using a personal computer 100, which generally includes, inter alia, a processor 102, random access memory SRAM) 104, data storage devices 106 (e.g., hard, floppy, and/or CD-ROM disk drives, etc.), data communications devices 108 (e.g., modems, network interfaces, etc.), display device 110 (e.g., a monitor, CRT, LCD display, etc.), cursor control device 112 (e.g., a mouse point device), and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 may operate under the control of an operating system 116. The present invention may be implemented in one or more application programs 118 that operate under the control of the operating system 116. The application program 118 may comprise a CAD program or other graphics program. In one or more embodiments of the invention, the application program 118 provides one or more intelligent objects 200.

Generally, the application program 118 and intelligent objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, system, data structure, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Intelligent Shape Objects

Figure 2:
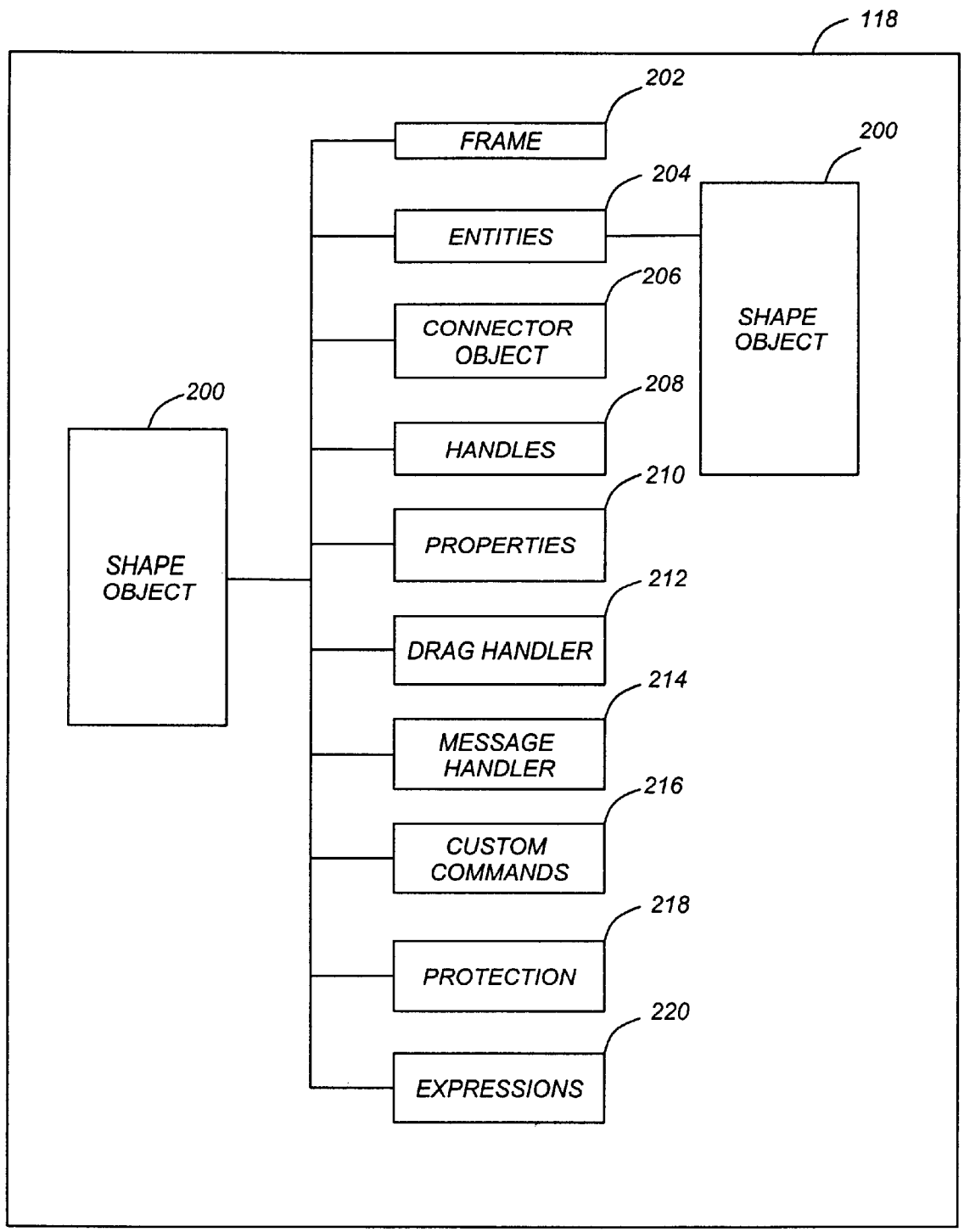
FIG. 2 illustrates the components of a shape object in accordance with one or more embodiments of the invention.

FIG. 2 is a block diagram that illustrates the components of an intelligent object in accordance with one or more embodiments of the invention. In FIG. 2, the intelligent object 200 is an intelligent shape object 200 that is comprised of one or more of the following different elements: (1) a spatial frame 202 that provides the underlying structure and spatial mapping for the intelligent shape object 200; (2) an entities collection 204 that includes zero or more objects of geometry along with zero or more other (subordinate) shape objects 200 that together make up the (superordinate) shape object 200; (3) zero or more connector objects 206 that provide connectivity to other connector objects 206 of other shape objects 200; (4) zero or more handles 208 that provide direct manipulation of the shape object 200, thereby allowing the user to stretch or otherwise resize the shape object 200; (5) a properties collection 210 that contains additional authorable properties of the shape object 200, e.g., extended properties defined by authors of the shape object 200; (6) a drag handler 212 that defines the behavior of the shape object 200 while the shape object 200 is being dragged; (7) a message handler 214 that defines the behavior of the shape object 200 when the shape object 200 receives system level commands or inputs; (8) a custom command collection 216 that allows the author to define extended commands for the shape object 200; (9) a protection object 218 that provides the ability to set and clear a password for other objects and properties 202–216; and (10) an expressions object 220 that manages properties 210 of an object. The frame 202, the entities 204, the connector objects 206, the handles 208, the properties 210, the drag handler 212, the message handler 214, the custom commands 216, the protection object 218, and the expressions object 220 may be imbued with data and logic that add intelligence to the shape object 200, in order to provide added convenience to the user.

Objects 200 can be uniquely named, and can also generate events that reflect changes from the objects contained within object 200. External software can subscribe to these events, ensuring that the external software is notified of any changes to the object 200.

Example Shape Object

As an example, consider an object 200 (e.g., a shape object 200) that describes a chair. Such an object 200 has a geometry, which describes the paths used to render the appearance of the chair on a page. The object 200 may be composed of geometry that describes the chair's support members, with sub-shapes making up the seat, back, arms and other elements (and each of those shapes have their own properties, geometry, and so on). The geometry representing the chair is stored in the entities collection 204 of the object 200.

The chair may be modular, taking optional wheels, arms, and levers, each of which connects to the object 200. These connection points are defined via connector objects 206. The chair may come in two or three sizes, any of which may be invoked by dragging handles 208. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, connector objects 206, handles 208, and properties 210 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the object 200 (e.g., a shape object) to a particular space, notably the document page coordinate space. The frame 202 is a property of the object 200, and as such is under the control of the author of the object 200, e.g., the Visual Basic for Applications (VBA) programmer, or anyone else with access to the object properties.

The frame 202 of an object 200 exposes a geometric framework to which the elements of the object 200 can be attached via expressions. The frame 202 also serves as a superstructure that relates all the other objects, some of which may be non-geometric, within the object 200. In addition, the frame 202 characterizes the spatial aspect of the object 200 as a whole, to allow the interpretation of methods such as Move, Rotate and Mirror. Finally, the frame 202 provides the mapping, if any, between the inside of the object 200 and the outside of the object 200.

The frame 202 is a description of a coordinate space that maps the local (inside the object 200) space to a parent (outside the object 200) space. For example, a straight line internal to a polar frame becomes an arc outside the frame. The frame 202 can encompass one, two, or three dimensional spaces.

Several types of frames 202 can be envisioned: line frames, rectangular frames, scaling rectangle frames, and polar frames.

A line frame 202 provides a frame 202 for a line shape object 200 that has a start point and an end point. The user can modify the start or end point and manipulate the start and end points of the line.

A rectangular frame 202 provides a frame for a shape object 200 that remains of constant scale, e.g., a chair that only comes in one size.

A scaling rectangle frame 202 provides a frame for a shape object 200 that expands and shrinks in size, e.g., a custom-built desktop should expand or shrink to fit a space exactly. However, a scaling rectangle frame 202 also encompasses frames that expand or shrink in increments, such as a cubicle wall, depending on what sizes are manufactured.

A polar frame 202 provides a frame for a shape object 200 that always expands or shrinks in both dimensions proportionally. Other types of frames are also possible with the present invention.

Entities Collection

The entities collection 204 stores a set of zero or more entities. An object 200 uses an entities collection 204 to define the geometry for rendering the object's 200 appearance. At least one entity holds the geometry that makes up the object 200. The entities collection 204 is a standalone collection of objects to hold geometry for shapes and other objects. In addition, the entities collection 204 can hold other objects 200 to fully define the object 200. A complex object 200 may comprise several entities, each of which may store some geometry as well as particular related sub-objects 200.

Connector Objects

The connector objects 206 enable geometric and logical connections between objects 200. Traditionally, a plug enables one side of the connection, and a socket enables the other side. In a connector object 206, plug and socket behavior ate merged into a single connector object 206 that no longer requires the use of separate plug and socket objects. Using flags, each connector object 206 may be configured to behave as either a plug (referred to as a plug connector), socket (referred to as a socket connector), or both. Since connector objects 206 can simultaneously act as plugs and sockets, connector objects 206 support bi-directional connections. For example, connector A may be plugged into connector B, and simultaneously, connector B is plugged into connector A.

A connector object 206 can be designed to accept any type of mating connectors, or specific types of connectors, much like electrical plugs and sockets used in a home to distinguish between 110V AC and 220V AC connections. For example, a deluxe chair shape object 200 may contain a connector object 206 configured as a socket connector that only accepts connector objects 206 configured as deluxe plug connectors to disallow mating less expensive seats, backs, and arms to the deluxe chair shape object 200.

Various flags, properties, or variables may be utilized in a connector object 206 to provide desired functionality. Table 1 illustrates one or more of the various flags, properties, or variables that a connector object 206 may contain.

TABLE 1

| PROPERTY | VALUE |
| --- | --- |
| POSITION | Real Numbers - the position of the connector object with respect to the shape's local or parent coordinate space. |
| ANGLE | Real Number - the angle of the connector object with respect to the shape's local or parent coordinate space |
| PLUG | Boolean - indicates whether the connector object can serve as a plug connector |
| SOCKET | Boolean - indicates whether the connector object can serve as a socket connector |
| RIGID | Boolean - indicates whether the POSITION of the connector object is constrained |
| ORIENTED | Boolean - indicates whether the ANGLE of the connector object is constrained |

A connector object may have a POSITION (with respect to the shape object's 200 local or parent coordinate space) and an ANGLE (to specify the angle at which it connects with other connector objects 206). A PLUG flag indicates whether the connector object 206 can be plugged into other connector objects 206. Similarly, a SOCKET flag indicates whether the connector object 206 can accept other connector objects 206.

A RIGID flag indicates whether a POSITION of a connector object 206 is constrained (i.e., whether the connector object 206 is constrained to its current POSITION in the shape object 200 or whether it may move). The RIGID flag is often used in conjunction with a connector object 206 configured as a plug connector to indicate how the connector object 206 behaves when a coupled socket connector is moved. For example, when a connector object 206 is configured as a RIGID plug connector that is coupled with a socket connector, the shape object 200 that owns the plug connector is moved and repositioned when the coupled socket connector is moved. If the plug connector is not RIGID, then the plug connector may alter/move its POSITION with respect to the geometry of the shape object 200.

An ORIENTED flag indicates whether an ANGLE of the connector object 206 is constrained. When the ORIENTED flag is set, the ANGLE of the connector object 206 is constrained to its current ANGLE in the shape object 200 and cannot be rotated relative to the shape object 200. Accordingly, if a plug connector is ORIENTED, instead of rotating the plug connector, the parent shape object 200 is rotated about the plug connector to reorient with a socket connector (e.g., when a socket connector is rotated). If the plug connector is not ORIENTED, the plug connector may simply be rotated.

FIGS. 3A–3C and FIGS. 4A–4C illustrate the effect of one or more of the above flags in accordance with embodiments of the invention. In each figure, the original display of a drawing/shape objects is illustrated on the left side, and the updated display of the drawing/shape objects is illustrated on the right side.

Figure 3A:
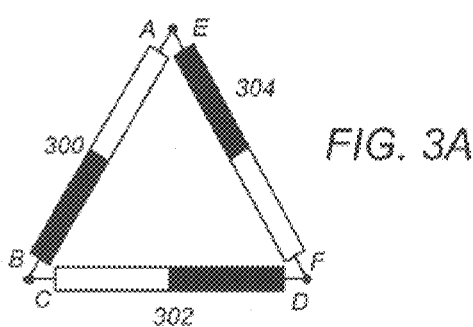
FIGS. 3A–3C illustrate the effect of ORIENTED and/or RIGID connector objects in accordance with one or more embodiments of the invention.
Figure 3A:
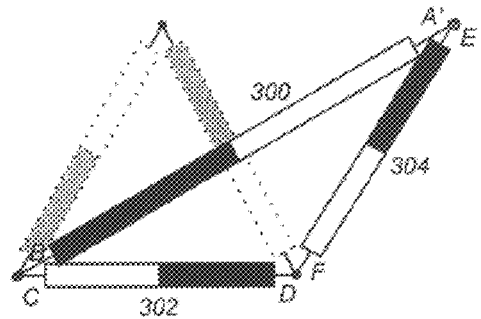
Figure 3B:
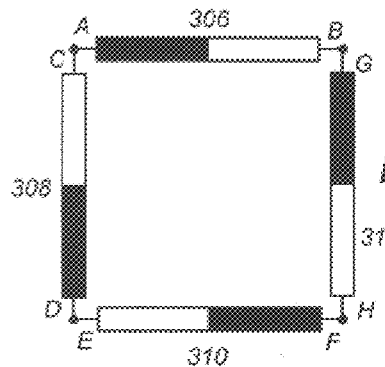
Figure 3B:
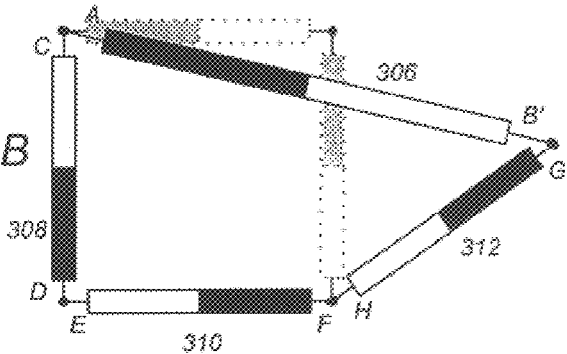
Figure 3C:
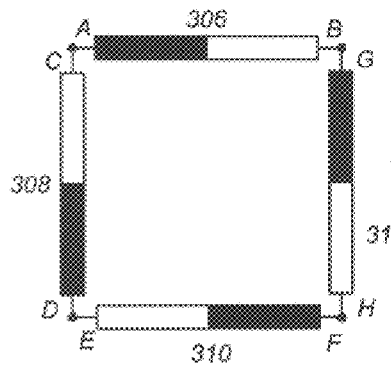
Figure 3C:
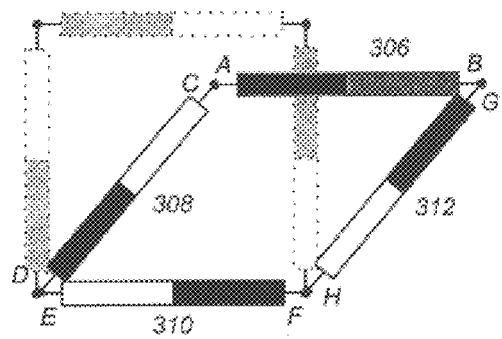

In FIGS. 3A–3C, each side of the triangle 300–304 and each side of the rectangles 306–312 is an "actuator" shape that has a bi-directional connector object A–H at each end. The positions of the two connector objects A–H on each end of the actuator define the shape object (i.e., the shape object's length, position, and orientation on a display screen). Essentially, an actuator shape object is similar to a line with two points. There are no constraints between the two points of an actuator shape. Consequently, if one end point is changed, the change does not propagate through the connecting line or to the other end point. In FIGS. 3A–3C, both the RIGID and ORIENTED flag on each connector object A–H are set to false.

Various actions may cause or result in the update of connections and/or connector objects. During such updates, the connector object (e.g., a plug connector) may be repositioned and reoriented with another connector object (e.g., a socket connector). In FIG. 3A, three actuator shape objects 300–304 are connected together via connector objects A–F. Each connection is bi-directional, and the overall connectivity is circular. Thus, if one of the connector objects A–F is moved, the non-rigid/non-oriented plug connector simply follows the socket connector. Further, since each actuator shape object 300–304 is defined by the positions of its two connector objects A–F, the actuator shape objects 300–304 may grow longer and rotate when a connector object A–F is moved.

As illustrated in FIG. 3A, connector object A is moved to A'. Connector object A drags any other connector object A–F plugged into it (i.e., connector object E) to the new location. Thus, the non-RIGID/non-ORIENTED plug connector E simply follows the socket connector that has moved (i.e., socket connector A). Additionally, since the actuator shape objects 300 and 304 are defined by the positions of their two connector objects (i.e., connector objects A and B, and connector objects E and F), the actuator shape objects 300 and 304 grow longer and rotate to follow connector objects A' and E.

In FIG. 3B, connector object B is moved to B'. Connector object B drags any other connector object A–F plugged into it (i.e., connector object G) to the new location. Thus, the non-RIGID/non-ORIENTED plug connector G simply follows the socket connector that has moved (i.e., socket connector B'). Similar to FIG. 3A, the actuator shape objects 306 and 312 are defined by the positions of their two connector objects (i.e., connector objects A and B, and connector objects G and H), and stretch and rotate to follow connector objects B' and G. As indicated in FIG. 3B, any change in the connector at B is not propagated to the two shape objects opposite B (i.e., shape objects 308 and 310).

In FIG. 3C, actuator shape object 306 is moved. Moving one of the actuator shape objects 306–312 is equivalent to moving both its end connectors. Accordingly, plug connector objects A–F that are plugged into socket connector objects A and B (i.e., plug connector objects C and G) are dragged to the new location. Thus, the non-RIGID/non-ORIENTED plug connector objects C and G simply follow the socket connectors that have moved (i.e., socket connectors A and B). Similar to FIGS. 3A and 3B the actuator shape objects 308 and 312 may be stretched and or rotated to follow the connector objects.

Figure 4A:
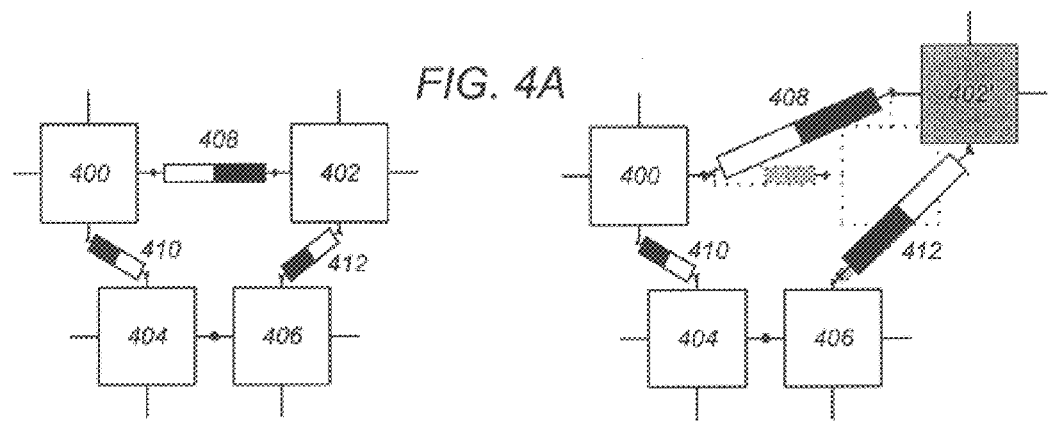
FIGS. 4A–4C illustrate the effect of ORIENTED and/or RIGID connector objects in accordance with one or more embodiments of the invention.
Figure 4B:
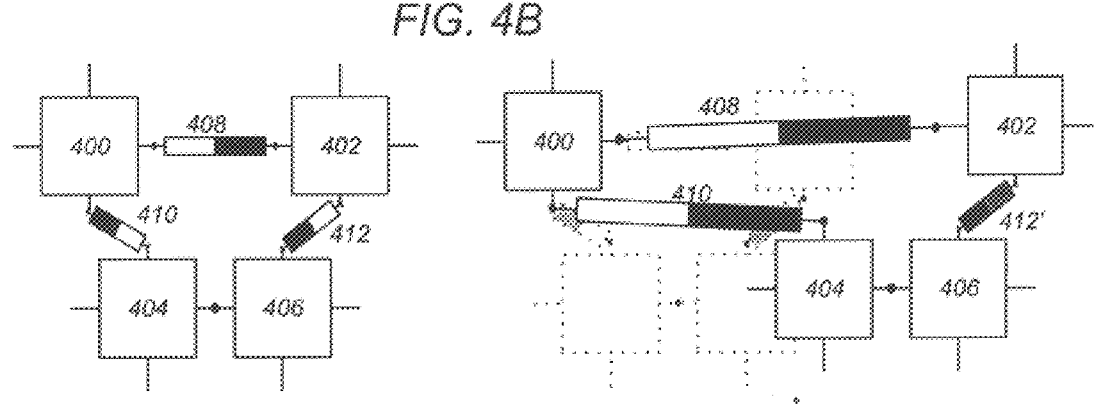
Figure 4C:
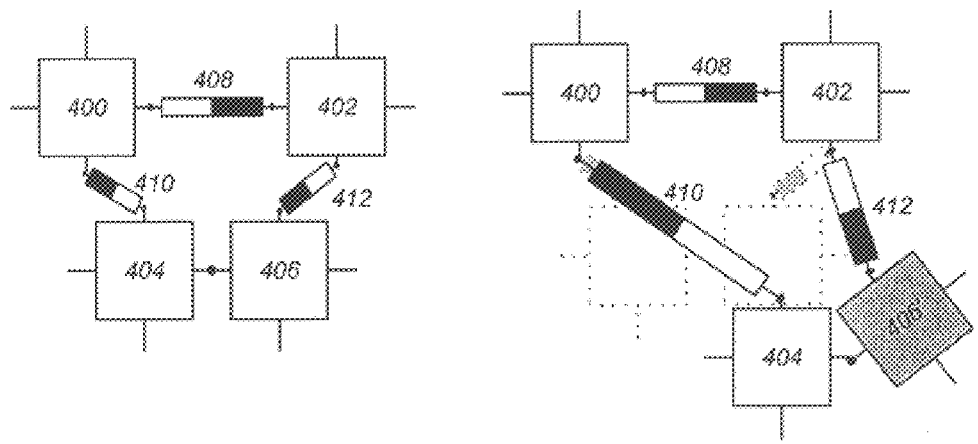

In FIGS. 4A–4C, four rectangular shape objects 400–406 are illustrated. Each rectangular shape object 400–406 has four connectors (one at the end of each small line sticking out) and all four of the connector objects can act as both plugs and sockets. Three actuator shape objects 408–412 join rectangular shape object 404 to 400, 400 to 402, and 402 to 406. Rectangular shape objects 404 and 406 are directly connected by their connector objects. Unlike the connector objects in the actuator shape objects 408–412, the connector objects on the rectangular shape objects 400–406 have their RIGID flag set to true and the ORIENTED flag set to false. All connections in the configurations of FIGS. 4A–4C are also bi-directional.

In FIG. 4A, rectangular shape object 402 is moved. Since the actuator shape objects' 408 and 412 connector objects are non-RIGID, the actuator shape objects' 408 and 412 connector objects that are connected to rectangular shape object 402 follow the movement. If the actuator shape objects' 408 and 412 connector objects were RIGID, the actuator shape objects 408 and 412 would move without resizing.

In FIG. 4B, actuator shape object 412 is moved. When the actuator shape object 412 is moved, both of the connector objects from shape objects 402 and 406 are updated. Since the connector objects on rectangular shape objects 402 and 406 are RIGID, each rectangle shape object 406 and 412 follows the actuator shape object's 412 connector objects and moves to the new location.

Subsequently, all incoming connections to the rectangle shape objects 402 and 406 also need to be resolved as a result of the movement of shape objects 402 and 406. Thus, the connector objects of actuator shape objects 408 and rectangular shape object 404 are updated. The update of the connector object for actuator shape object 408 causes actuator shape object 408 to stretch and rotate. The update of the connector object for rectangular shape object 404 causes rectangular shape object 404 to move to a new location. Such movement of rectangular shape object 404 results because the connector objects of rectangular shape object 404 are RIGID. If such connector objects were non-rigid, the connector object itself would move and the rectangular shape would remain in the same position. The movement of rectangular shape object 404 causes the connector object of actuator shape object 410 to be updated thereby resulting in the stretch and rotation of actuator shape object 410.

In FIG. 4C, rectangular shape object 406 is moved and rotated. Similar to FIGS. 4A and 4B, the rotation and movement of rectangular shape object 406 causes actuator shape 412 to stretch and rotate. Further, the rotation and movement of rectangular shape object 406 also causes connector objects plugged into rectangular shape object 406

(i.e., the connector object of rectangular shape object 404) to be updated. Since rectangular shape object's 404 connector objects are RIGID, rectangular shape object 404 repositions itself Since rectangular shape object's 404 connector objects are not ORIENTED, rectangular shape object 404 is not rotated. Instead, the angle for the connector object of rectangular shape object 404 is updated. The movement of rectangular shape object 404 causes actuator shape object 410 to stretch and rotate.

Connection Manager

The task of resolving/updating connections and connector objects may be delegated to an external connection manager. The connection manager may be configured or called upon to resolve connections in various circumstances. For example, connections may be resolved when a screen is refreshed. Additionally, connections may be resolved upon the issuance or after the execution of a shape command (a command for a shape object to perform an action), when a shape is resized, or in response to a message received by a shape's message handler. Generally, connections are resolved whenever it is desirable to ensure that connections are updated and current.

Given a list of changed connections, the connection manager uses a spanning-tree algorithm to efficiently update all connections, including circular references. Having an external connection manager allows complete control over when connections ate resolved.

Figure 5:
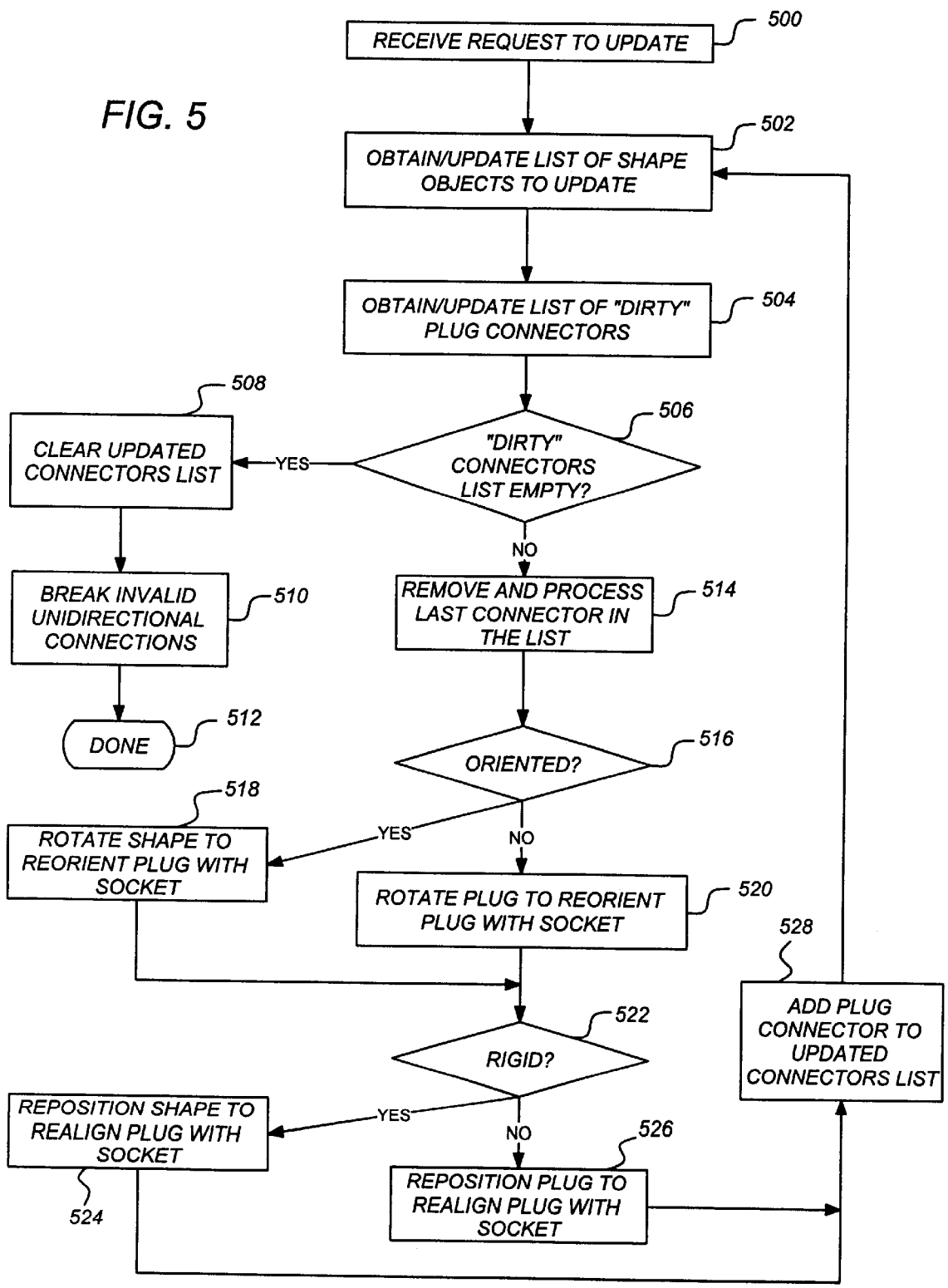
FIG. 5 is a flow chart that illustrate s the connection update process in accordance with one or more embodiments of the invention.

FIG. 5 is a flow chart that illustrates the connection update process. Referring to both FIG. 5 and FIG. 2, at step 500, the connection manager receives a request to update the connections and/or connector objects 206 in a drawing. At step 502, a list of shape objects 200 to update is obtained. Any shape that has changed connector objects 206 or that has been modified may be added to such a list. This list may be continuously updated when additional shape objects are modified and added to the list. Further, depending on the embodiment, the same shape object may or may not be added to the shape object list more than once.

Referring to FIG. 3A, when connector object A is moved, shape object 300 is initially added to the list at step 502. Similarly, in FIG. 3B, shape object 306 is initially added to the list and in FIG. 3C, shape object 306 is initially added to the list. In FIG. 4A, shape object 402 is initially added to the list. In FIG. 4B, shape object 412 is initially added to the list. In FIG. 4C, shape object 406 is initially added to the list.

At step 504, a list of "dirty" plug connectors is obtained. To obtain the list, each shape object in the shape object list obtained at step 502 is processed to determine any incoming connections (i.e., plug connector objects) that are coupled to socket connector objects that are part of the shape object being evaluated. All incoming plug connector objects get added to the dirty connectors list, with the condition that a plug connector may not be added to the dirty connectors list if the connector is already in an updated connectors list (depending on the embodiment). Plug connectors in the updated connectors list are those connectors that have already been processed and updated.

Referring to FIG. 3A, plug connector objects C and E are added to the dirty connectors list when socket connector object A belonging to shape object 300 is moved. In FIG. 3B, plug connector objects C and G are added to the list. In FIG. 3C, plug connector objects C and G are added to the list. Referring to FIG. 4A, the plug connector objects in shape objects 408 and 412 connecting them to shape object 402 are added to the list. In FIG. 4B, plug connector objects in shape objects 402 and 406 connecting them to shape object 412 are added to the list. In FIG. 4C, plug connector objects in shape objects 404 and 412 connecting them to shape object 406 are added to the list. As will be seen below, as each plug connector object is processed, additional shape objects and plug connector objects may be added to the lists for processing.

Referring back to FIG. 5, at step 506, a determination is made regarding whether the dirty connectors list is empty. If the dirty connectors list is empty, the updated connectors list is cleared at step 508, any invalid unidirectional connections, if any, are broken at step 510, and the update process is complete at step 512. Breaking any invalid unidirectional connections comprises breaking the connection or coupling between a plug connector object and socket connector when the connection is invalid. Such a connection may be invalid when the connector object is not bi-directional (e.g., the connector object is only a socket connector object), and the plug connector object coupled to it has moved as a result of some processing. In such a circumstance, the socket connector object may not be "dragged" with the plug connector object and becomes "unplugged".

If the dirty connectors list is not empty at step 506, the last plug connector object in the list is processed at step 514. Accordingly, the plug connector objects are processed in last-in-first-out order.

At step 516, a determination is made regarding whether the ORIENTED flag for the plug connector object is set. If the plug connector object is ORIENTED, the shape object that owns the plug connector object is rotated about the plug connector object, if necessary, to reorient the plug connector object with the coupled socket connector object at step 518. However, if the plug connector object is not ORIENTED, the plug connector object itself is rotated, if necessary, to reorient the plug connector object with the coupled socket connector object at step 520.

Referring to FIG. 4A, the plug connector objects in actuator shape objects 408 and 412 connecting them to shape object 402 are not ORIENTED, accordingly, the plug connector objects rotate. In FIG. 4B, plug connector objects in rectangular shape objects 402 and 406 connecting them to shape object 412 rotate to accommodate the new angles of the socket connector objects they are coupled to. Similarly, in FIG. 4C, the plug connector object owned by shape object 404 rotates to accommodate the new angle of the socket connector object owned by shape object 406'.

Referring again to FIG. 5, the process continues at step 522 wherein the connection manager determines if the RIGID flag for the plug connector object is TRUE. If the plug connector object is RIGID, the shape object that owns the plug connector object is repositioned, if necessary, at step 524 to accommodate any movement of the coupled socket connector object. If the plug connector object is not RIGID, the plug connector itself is repositioned, if necessary, at step 526 to accommodate any movement of the coupled socket connector object.

Referring to FIG. 4A, the plug connector objects in each actuator shape object 408 and 412 (that are coupled to shape object 402) are not RIGID and therefore are repositioned with the movement of the socket connector objects of shape object 402. However, since actuator shape objects 408 and 412 are particular types of shape objects that are defined by their connector objects, the actuator shape objects stretch and rotate.

Referring to FIG. 4B, the plug connector objects owned by shape objects 402 and 406 (that are connected to actuator shape object 412) are RIGID, and therefore, shape objects 402 and 406 are repositioned based on the movement of the socket connector objects of actuator shape object 412. Additionally, the movement of shape object 406 causes the update of any incoming plug connectors of shape object 406 (i.e., the plug connector of shape object 404 and actuator shape object 412). When the plug connector object of shape object 404 is updated, shape object 404 is repositioned since the plug connector object is RIGID and cannot separate from the geometry of shape object 404.

Referring to FIG. 4C, the movement of shape object 406 causes the plug connector object owned by shape object 404 to reposition. Since the plug connector object is RIGID, shape object 404 is repositioned to a new location.

Referring back to FIG. 5, once the shape object and/or plug connector object is reoriented, if necessary, and repositioned, if necessary, the plug connector object is added to the updated connectors list at step 528. The process continues at steps 502 and 504 where the shape object list and dirty connectors list are updated. The lists are updated as follows: if the end result of updating the dirty plug connector was to reorient and/or reposition its parent shape object, then add that shape object to the shape object list at step 502; otherwise add any incoming connector objects that are coupled to the dirty plug connector to the dirty connectors list at step 504. In this manner, the connector objects are processed recursively and added to the updated connectors list until the dirty connectors list is empty at which time the updated connectors list is cleared at step 508.

The process set forth in FIG. 5 may be better illustrated by examining FIGS. 4A–4C. In FIG. 4A, shape object 402 is moved to a new location. Table 2 shows which shape objects and connector objects participate in the shape object list, dirty connectors list, and updated connectors list as the connection manager processes the operation in FIG. 4A. Note that because shape objects and connector objects are dynamically added to and removed from these lists during the processing, this table does not represent a snapshot of the lists at any particular time.

TABLE 2

| SHAPE OBJECT LIST | DIRTY CONNECTORS | UPDATED CONNECTORS |
|---|---|---|
| 402 | 412–402 | 408–402 |
|  | 408–402 | 402–408 |
|  | 402–408 | 412–402 |
|  | 402–412 | 402–412 |

At step 502, shape object 402 is added to the shape object list. Incoming connector objects for shape object 402 (i.e., plug connector objects between shape objects 412–402 and shape objects 408–402) are added to the dirty connectors list, and shape object 402, having been processed, is removed from the shape object list. The last connector on the dirty connectors list 408–402 is removed and processed, and causes the stretching and rotation of shape object 408. Because connector 408–402 is non-ORIENTED and non-RIGID, it is rotated at step 520 and repositioned at step 526 before being added to the updated connectors list at step 528. Because shape object 408 was neither rotated nor repositioned, it does not get added to the shape object list at step 502. Because connector object 408–402 was rotated and repositioned, all connector objects plugged into connector object 408–402 (i.e., plug connector 402–408) get added to the dirty connectors list at step 504. Connector 402-408 is then removed from the end of the dirty connectors list and processed, resulting in no rotation or repositioning of either connector 402–408 or shape object 402. Thereafter, connector object 402–408 is added to the resolved list at step 528.

The next plug connector 412–402 on the dirty connector list is removed and processed, and causes the stretching and rotation of shape object 412. Because connector 412–402 is non-ORIENTED and non-RIGID, it is rotated at step 520 and repositioned at step 526 before being added to the updated connectors list at step 528. Because shape object 412 was neither rotated not repositioned, it does not get added to the shape object list at step 502. Because connector object 412–402 was rotated and repositioned, all connector objects plugged into connector object 412–402 (i.e., plug connector 402–412) are added to the dirty connectors list at step 504. Removal and processing of connector 402–412 results in no rotation or repositioning of either connector 402–412 or shape object 412, and connector object 402–412 is added to the resolved list at step 528. Thereafter, the dirty connector list is empty, the updated connectors list is cleared at step 508, any invalid unidirectional connections are broken at step 510 (there are no such connections in FIG. 4A), and the process is complete at step 512.

Referring to FIG. 4B, actuator shape object 412 is moved. Table 3 shows which shape objects and connector objects participate in the shape object list, dirty connectors list, and updated connectors list as the operation in FIG. 4B is processed.

TABLE 3

| SHAPE OBJECT LIST | DIRTY CONNECTORS | UPDATED CONNECTORS |
|---|---|---|
| 412 | 402–412 | 406–412 |
| 406 | 406–412 | 404–406 |
| 404 | 412–406 | 410–404 |
| 402 | 404–406 | 404–410 |
|  | 406–404 | 406–404 |
|  | 410–404 | 412–406 |
|  | 404–410 | 402–412 |
|  | 412–402 | 408–402 |
|  | 408–402 | 402–408 |
|  | 402–408 | 412–402 |

At step 502, actuator shape object 412 is added to the shape object list. Plug connector objects plugged into socket connector objects of actuator shape object 412 (i.e., plug connector objects 402–412 and 406–412) are then added to the dirty connector list at step 504. The last connector 406–412 on the list is then processed at step 514 resulting in the movement of shape object 406 (due to the RIGIDITY of connector object 406–412). Connector object 406–412 is added to the updated connectors list and shape object 406 is added to the shape object list. Further, plug connector objects 412–406 and 404–406 are added to the dirty connector list at step 504. Plug connector object 404–406 is then processed at step 514. The processing results in shape object 404 being moved at step 524. The process continues with the various lists being updated and processed as indicated in Table 3.

Similar to the processing illustrated in the Tables above, Table 4 shows which shape objects and connector objects participate in the shape object list, dirty connectors list, and updated connectors list as the operation in FIG. 4C is processed.

TABLE 4

| SHAPE OBJECT LIST | DIRTY CONNECTORS | UPDATED CONNECTORS |
|---|---|---|
| 406 | 412–406 | 404–406 |
| 404 | 404–406 | 410–404 |

TABLE 4-continued

| SHAPE OBJECT LIST | DIRTY CONNECTORS | UPDATED CONNECTORS |
|---|---|---|
| | 406–404 | 404–410 |
| | 410–404 | 406–404 |
| | 404–410 | 412–406 |
| | 406–412 | 406–412 |

As described above, and illustrated in FIGS. 3A–3C, 4A–4C, and 5, the connection manager updates connector objects recursively to accurately reflect any changes and modifications.

Handles

The handles 208 are points located within the object 200 that are exposed to the user interface (UI) when the object 200 is selected. Handles 208 allow direct manipulation of geometry within the object 200, as well as any other object 200 parameter that can be referenced via expressions.

Handles 208 have properties, such as x-y position, geometry, and define a relationship between mouse and handle position. With the handles 208 of the present invention, the shape author can constrain handles to particular range of motion as function of mouse movement. Typically, the handle 208 x and y coordinates are directly related to the mouse x and y coordinates. However, the handle 208 of the present invention allows the shape author to relate the handle 208 x and y coordinates to any function, or a constant. For example, the shape author can equate the x coordinate of the handle 208 (handlex) to a constant, and the y coordinate of handle 208 (handley) to the y coordinate of cursor control device 112. This would create a handle 208 that moves only in the y direction regardless of the x position of the cursor control device 112. The shape author can use any expression, e.g., trigonometric functions, equations, or other functions to constrain handle properties. The handle 208 position is thus independent of mouse position, and the shape author relates the handle 208 position to the mouse pointing device 112 position by using an expression to achieve any desired handle 208 motion.

Properties

The properties 210 are other custom or extended properties defined by the object 200 author not contained within the frame 202, connector objects 206, and handles 208. For example, custom properties 210 can be a manufacturer code (a string), a price (a currency value), a coefficient of friction for a given material, a floating point value, etc. Properties 210 can also be defined for intermediate or scratch values within an object 200.

One or more embodiments of the invention may also provide an expressions property that points to the object's 200 expressions object 220.

The Drag Handler

The object 200 may contain objects that handle messages and the behavior of the object 200. The object 200 may contain an object that, for example, handles the object's 200 drag and drop behavior. This object is known as the drag handler 212. The drag handler 212 can be customized or initially authored by a user, which enables a user to change the actions performed by the object 200 upon entering the program as well as the object's 200 interactions with other objects 200.

The Message Handler

The object 200 also contains an object that handles messages passed down from the containing system. This object is called the message handler 214. The message handler 214, like the drag handler 212, can be customized or initially authored by a user, which enables a user to change the actions performed by the object 200 in response to keyboard, mouse, and other system events.

Custom Commands

In addition to the above, each object 200 has custom commands 216 that can be programmed by the user. These custom commands 216 are accessed by the user by using a context menu, typically accessed by using the right hand button on a cursor control device 112. For example, the chair shape object 200 described above may have a custom command 216 associated with it to include a solid back on the shape object 200, or a carved back, or a padded seat, etc., depending on the desires of the user.

Connector Objects as Positioning and Alignment Aids

In the preferred embodiment, the connector objects 206 are objects owned by shape objects 200 that assist the user in positioning the shape objects 200 relative to one another. The connector objects 206 are highlighted portions of the shape object 200 that have position, orientation, and other programmable properties that allow for directed interaction between shape objects 200 within a document.

For example, when connecting two shape objects 200 together, the connector objects 206 automatically position the shape object 200 being dragged so that one shape object 200 connects to another properly. No rotation or flip tools, typically dragged from a toolbar, are required; the connector object 206 properties automatically rotate and/or flip the shape object 200 to fit properly with adjoining shape objects 200. Thus, a drawing can be created by "snapping" or "gluing" together several various predefined components, e.g., squares, lines, text boxes, etc., where the connector objects 206 assist the user by showing the user which connections are proper, which connections are improper, and orienting and positioning each shape object 200 for the user. This automatic orientation and positioning makes creation of drawings and textual materials simpler and less time consuming.

Further, users can define their own shape objects 200, with custom definitions for connector objects 206, to fit specific applications. An editor utility is used to define shape objects 200 and connector objects 206. The editor utility can be graphical in nature, or can allow the user to directly write software code instructions to edit the connector objects 206 and other shape object 200 properties.

Additionally, connector objects 206 may be dynamic. With dynamic connector objects 206, a socket connector object may be created, on demand, at any location on other shapes to allow the user to couple another shape together with a callout shape. Such socket connector objects 206 are dynamic in that they are created on demand, and may be removed when no more plug connector objects are plugged into them.

Without dynamic socket connector objects 206, a connection may not be established between a callout shape and another shape, unless the user initially plugged a plug connector object 206 of the callout shape into a predefined socket connector object on the other shape, which limits the flexibility of attaching the callout shape to other shapes. By using dynamic socket connector objects 206, however, a socket connector object 206 is dynamically created on the other shape if a socket connector object does not yet exist at that location on the other shape, and the callout shape is plugged into this newly created socket connector object 206.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

Those skilled in the art will recognize that additional functions may also be implemented using the intelligent shape objects and connector objects of the present invention. In addition, the connector objects and intelligent shapes can be integrated closely with each application program by any number of different methods.

In summary, the present invention discloses a method, apparatus, and article of manufacture for connecting shape objects in a computer within a drawing application (e.g., CAD application program), wherein shape objects are connected using bi-directional connector objects that permits the connector objects to behave as both a socket connector and a plug connector. Connections/connector objects of a shape/drawing ate resolved/updated by an external connection manager that recursively processes incoming connector objects configured as plug connectors for each modified shape object.

The foregoing description of one or more embodiments of the invention has been presented for the purposes of illustration and description. It is not intended to be exhaustive or to limit the invention to the precise form disclosed. Many modifications and variations ate possible in light of the above teaching. It is intended that the scope of the invention be limited not by this detailed description, but rather by the claims appended hereto.

What is claimed is:

1. A computer implemented method of connecting objects displayed on a display device, comprising:
   displaying, on a display device, a first object having a first connector object, wherein the first connector object is an instance of a connector object, wherein the connector object supports bi-directional connections such that an instance of the connector object may behave as both a socket connector and as a plug connector;
   displaying, on the display device, a second object having a second connector object, wherein the second connector object is an instance of the connector object; and
   coupling the first connector object to the second connector object such that both the first object and the second object behave simultaneously as sockets and plugs.

2. The method of claim 1 further comprising an external connection manager resolving connections by:
   determining that connections for a shape should be resolved;
   determining one or more socket connector objects for the shape;
   determining plug connector objects, that need to be updated, from one or more other shapes coupled to the determined socket connector objects; and
   updating each determined plug connector object.

3. The method of claim 2 wherein the shape has a socket connector that has been changed.

4. The method of claim 2 wherein the shape has been rotated.

5. The method of claim 2 wherein the shape has been moved to a different location.

6. The method of claim 2 wherein updating each determined plug connector object comprises:
   determining if a plug connector object is rigid;
   if the plug connector object is rigid, moving the shape that owns the plug connector object to cause the plug connector object to reposition with the socket connector object; and
   if the plug connector object is not rigid, moving the plug connector object to reposition the plug connector object with the socket connector object.

7. The method of claim 2 wherein updating each determined plug connector object comprises:
   determining if a plug connector object is oriented;
   if the plug connector object is oriented, rotating the shape that owns the plug connector object about the plug connector object to reorient the plug connector object with the socket connector object; and
   if the plug connector object is not oriented, rotating the plug connector object to reorient the plug connector object with the socket connector object.

8. The method of claim 2 wherein the connection is resolved when a screen is refreshed.

9. The method of claim 2 wherein the connection is resolved when it is desirable to ensure that one or more connectors are up to date.

10. The method of claim 2 wherein the determined plug connector objects are processed in last-in-first-out order from a list of plug connector objects to be updated.

11. The method of claim 10 further comprising maintaining a list of updated connector objects, wherein a connector object is not added to the list of connector objects to be updated if the connector object is already in the list of updated connector objects.

12. The method of claim 1 further comprising:
   checking a connection; and
   breaking the connection if a connector object in the connection is an invalid unidirectional connector object.

13. A computer-implemented apparatus for connecting objects displayed on a display device comprising:
   a computer having a display device attached thereto;
   means for displaying, on the display device, a first object having a first connector object, wherein the first connector object is an instance of a connector object, wherein the connector object supports bi-directional connections such that an instance of the connector object may behave as both a socket connector and as a plug connector;
   means for displaying, on the display device, a second object having a second connector object, wherein the second connector object is an instance of a connector object; and
   means for coupling the first connector object to the second connector object such that both the first object and the second object behave simultaneously as sockets and plugs.

14. The apparatus of claim 13 further comprising means for resolving connections comprising:
   means for determining that connections for a shape should be resolved;
   means for determining one or more socket connector objects for the shape;
   means for determining plug connector objects, that need to be updated, from one or more other shapes coupled to the determined socket connector objects; and
   means for updating each determined plug connector object.

15. The apparatus of claim 14 wherein the shape has a socket connector that has been changed.

16. The apparatus of claim 14 wherein the shape has been rotated.

17. The apparatus of claim 14 wherein the shape has been moved to a different location.

18. The apparatus of claim 14 wherein the means for updating each determined plug connector object comprises:
    means for determining if a plug connector object is rigid;
    means for moving the shape that owns the plug connector object to cause the plug connector object to reposition with the socket connector object if the plug connector object is rigid; and
    means for moving the plug connector object to reposition the plug connector object with the socket connector object if the plug connector object is not rigid.

19. The apparatus of claim 14 wherein the means for updating each determined plug connector object comprises:
    means for determining if a plug connector object is oriented;
    means for rotating the shape that owns the plug connector object about the plug connector object to reorient the plug connector object with the socket connector object if the plug connector object is oriented; and
    means for rotating the plug connector object to reorient the plug connector object with the socket connector object if the plug connector object is not oriented.

20. The apparatus of claim 14 wherein the connection is resolved when a screen is refreshed.

21. The apparatus of claim 14 wherein the connection is resolved when it is desirable to ensure that one or more connectors are up to date.

22. The apparatus of claim 14 wherein the determined plug connector objects are processed in last-in-first-out order from a list of plug connector objects to be updated.

23. The apparatus of claim 22 further comprising means for maintaining a list of updated connector objects, wherein a connector object is not added to the list of connector objects to be updated if the connector object is already in the list of updated connector objects.

24. The apparatus of claim 13 further comprising:
    means for checking a connection; and
    means for breaking the connection if a connector object in the connection is an invalid unidirectional connector object.

25. An article of manufacture comprising a computer program carrier readable by a computer and embodying one or more instructions executable by the computer to perform a method of connecting objects displayed on a display device attached to the computer, the method comprising:
    displaying, on a display device, a first object having a first connector object, wherein the first connector object is an instance of a connector object, wherein the connector object supports bi-directional connections such that an instance of the connector object may behave as both a socket connector and as a plug connector;
    displaying, on the display device, a second object having a second connector object, wherein the second connector object is an instance of the connector object; and
    coupling the first connector object to the second connector object such that both the first object and the second object behave simultaneously as sockets and plugs.

26. The article of manufacture of claim 25, the method further comprising resolving connections by:
    determining that connections for a shape should be resolved;
    determining one or more socket connector objects for the shape;
    determining plug connector objects, that need to be updated, from one or more other shapes coupled to the determined socket connector objects; and
    updating each determined plug connector object.

27. The article of manufacture of claim 26 wherein the shape has a socket connector that has been changed.

28. The article of manufacture of claim 26 wherein the shape has been rotated.

29. The article of manufacture of claim 26 wherein the shape has been moved to a different location.

30. The article of manufacture of claim 26 wherein updating each determined plug connector object comprises:
    determining if a plug connector object is rigid;
    if the plug connector object is rigid, moving the shape that owns the plug connector object to cause the plug connector object to reposition with the socket connector object; and
    if the plug connector object is not rigid, moving the plug connector object to reposition the plug connector object with the socket connector object.

31. The article of manufacture of claim 26 wherein updating each determined plug connector object comprises:
    determining if a plug connector object is oriented;
    if the plug connector object is oriented, rotating the shape that owns the plug connector object about the plug connector object to reorient the plug connector object with the socket connector object; and
    if the plug connector object is not oriented, rotating the plug connector object to reorient the plug connector object with the socket connector object.

32. The article of manufacture of claim 26 wherein the connection is resolved when a screen is refreshed.

33. The article of manufacture of claim 26 wherein the connection is resolved when it is desirable to ensure that one or more connectors are up to date.

34. The article of manufacture of claim 26 wherein the determined plug connector objects are processed in last-in-first-out order from a list of plug connector objects to be updated.

35. The article of manufacture of claim 34, the method further comprising maintaining a list of updated connector objects, wherein a connector object is not added to the list of connector objects to be updated if the connector object is already in the list of updated connector objects.

36. The article of manufacture of claim 25, the method further comprising:
    checking a connection; and
    breaking the connection if a connector object in the connection is an invalid unidirectional connector object.

* * * * *